United States Patent [19]
Schmidt et al.

[11] Patent Number: 5,522,611
[45] Date of Patent: Jun. 4, 1996

[54] MULTIPLE SPROCKET CHAINWHEEL FOR BICYCLE DERAILLEUR

[75] Inventors: Frank Schmidt; Andreas Neuer, both of Schweinfurt; Gerhard Dumbser; Jörg Bodmer, both of Niederwerrn, all of Germany

[73] Assignee: Fichtel & Sachs AG, Schweinfurt, Germany

[21] Appl. No.: 374,950

[22] Filed: Jan. 18, 1995

[30] Foreign Application Priority Data

Jan. 18, 1994 [DE] Germany .............. 44 01 272.1

[51] Int. Cl.⁶ .............. B62M 1/02; B62M 9/04
[52] U.S. Cl. .............. 280/259; 192/64
[58] Field of Search .............. 280/259, 260, 280/261, 236; 192/64

[56] References Cited

U.S. PATENT DOCUMENTS

| | | | |
|---|---|---|---|
| 3,900,088 | 8/1975 | Ozaki | 192/64 |
| 4,966,380 | 10/1990 | Mercat | 280/259 |

FOREIGN PATENT DOCUMENTS

| | | |
|---|---|---|
| 0012568 | 6/1980 | European Pat. Off. . |
| 2842362 | 4/1979 | Germany . |
| 3041784 | 5/1981 | Germany . |
| 3130258 | 6/1982 | Germany . |
| 8811752 | 12/1988 | Germany . |
| 1582793 | 1/1981 | United Kingdom . |

*Primary Examiner*—Mitchell J. Hill
*Attorney, Agent, or Firm*—Nils H. Ljungman & Assoc.

[57] ABSTRACT

A multiple sprocket chainwheel for bicycle derailleurs to drive a hub bushing on the rear wheel by means of at least two sprockets which have different numbers of teeth, and which are located non-rotationally on a chainwheel bushing, whereby spacing connecting rings with bearings and a drive bushing are located between the sprockets, which drive bushing is driven in the driving direction by the chainwheel bushing by means of a freewheel mechanism, whereby the connecting rings have clamping projections which can be inserted into clamping points on the sprockets, which makes possible it possible to have an alternating arrangement in series of a sprocket, a connecting ring, a sprocket, a connecting ring etc. The desired position of one sprocket in relation to another is achieved when a guide tooth on the inside diameter of the one sprocket coincides with the guide tooth on another sprocket. A packet of sprockets combined in this manner has an axially continuous guide tooth which, when located in a longitudinal groove on the circumference of the drive bushing, guarantees the angular position of each part slid onto the drive bushing. The multiple sprocket chainwheel, which can be modified or repaired without tools, can be treated as a pre-assembled component or as a replacement part, whereby its particular advantage is that the individual sprockets can be replaced, or the entire multiple sprocket chainwheel can be assembled manually by the customer.

20 Claims, 3 Drawing Sheets

MULTIPLE SPROCKET CHAINWHEEL FOR BICYCLE DERAILLEUR

BACKGROUND OF THE INVENTION

1. Field of the Invention

This invention generally relates to a multiple sprocket chainwheel for bicycle derailleurs with at least two sprockets which have different numbers of teeth, and which are non-rotationally located on a chainwheel bushing, whereby between the sprockets there are spacer connecting rings, with bearings and a drive bushing which is driven in the driving direction of rotation by the chainwheel bushing by means of a freewheel mechanism.

2. Background Information

A multiple sprocket chainwheel is disclosed, for example, in German Patent Application No. 28 42 362, which essentially relates to the axial mounting of a complete driving part consisting of a multiple sprocket chainwheel, bearing and freewheel mechanism. The multiple sprocket chainwheel, as shown in particular in FIG. 3 in German Patent Application No. 28 42 362, is comprised of a pre-assembled unit which is held together by one or more screws which run axially and which clamp the numerous sprockets together with connecting rings. Such a package of sprockets is slid onto a chainwheel bushing and is axially fixed in the stop position, or contact position. After the fixing of the multiple sprocket chain wheel on the chainwheel bushing, the axial bracing of the sprockets and connecting rings is essentially irrelevant to the function of the chain drive. The only advantage, essentially, is the ease of handling the multiple sprocket chainwheel before and after its installation on the bicycle in its axially fixed position on the chainwheel bushing.

The initial installation and reinstallation of a multiple sprocket chainwheel as disclosed in German Patent Application No. 28 42 362 can essentially only be done using tools, which is a particular disadvantage in competitive racing, if the composition of a multiple sprocket chainwheel has to be changed quickly with regard to the number of teeth of its individual sprockets.

On the other hand, a multiple sprocket chainwheel, in accordance with at least one embodiment of the present invention, with the use of essentially a single type of connecting ring, can be assembled as desired without tools, whereby it is possible for the initial installer to prepare preassembled multiple sprocket chainwheels and to supply the retail store with the individual sprockets and the connecting rings.

Thus it becomes easy to replace individual sprockets, whereby such an installation can be done by practically anyone. The position of the sprockets with respect to one another with regard to their mutual orientation, their tooth configuration and shape can easily be achieved by means of specially located clamping devices, which are preferably located in a defined position in relation to an asymmetrically located longitudinal groove and profile, which profile is preferably used to slide the sprockets and the connecting rings onto the chainwheel bushing.

OBJECT OF THE INVENTION

The object of the present invention is therefore to create a multiple sprocket chainwheel which can be slid onto on a chainwheel bushing, in which the sprockets can be connected to one another, each by means of a connecting ring which also acts as a spacer, by hand and without tools, whereby no additional connecting means such as screws, rivets, bolts etc. are used.

SUMMARY OF THE INVENTION

The invention teaches that this object can be accomplished by means of at least one connecting ring on its two plane surfaces which has at least one clamping projection which projects from the two plane surfaces and the contour of which matches the contour of clamping positions in the adjacent sprockets, whereby a permanent connection can be made in the axial direction between the connecting rings and sprockets.

Other advantageous configurations of the invention are disclosed herebelow.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

In summary, one aspect of the invention resides broadly in a bicycle, the bicycle comprising: a frame; at least two wheels, the at least two wheels comprising at least a front wheel and a rear wheel; the at least two wheels being rotatably mounted on the frame; means for propelling at least one of the front wheel and the rear wheel; the propelling means comprising: a chain; at least two sprocket sets to engage the chain, each of the at least two sprocket sets comprising at least one sprocket; at least two pedals, the at least two pedals being connected to one of the at least two sprocket sets; foot powered moving means, the foot powered moving means comprising the sole moving means for moving the bicycle during riding of the bicycle by a cyclist; a seat, the seat being disposed on the frame; a handlebar for steering the bicycle; braking means for slowing the movement of the bicycle; at least one wheel hub being mounted on at least one of the at least two wheels; at least one of the at least two sprocket sets comprising: a first sprocket and a second sprocket; the first sprocket comprising: means for connecting with one of the at least one wheel hub; means for carrying a portion of the chain during propulsion of the at least one of the front wheel and the rear wheel; the second sprocket comprising: means for connecting with the one of the at least one wheel hub; means for carrying a portion of the chain during propulsion of the at least one of the front wheel and the rear wheel; the first sprocket and the second sprocket having a common axis of rotation; the first sprocket and the second sprocket each having a plane of rotation; means for selectively transferring the chain between the first sprocket means and the second sprocket means; connecting means, interposed between the first and second sprockets, for: non-rotatably connecting the first and second sprockets with one another; and holding the first sprocket means and the second sprocket means in a fixed spaced-apart relation with respect to one another; and means for permitting selective detachment of the first sprocket means, the second sprocket means and the connecting means with respect to one another upon application of a detaching force on one or more of the first sprocket means, the second sprocket means and the connecting means.

BRIEF DESCRIPTION OF THE DRAWINGS

The invention is described in greater detail below, with reference to an embodiment of a multiple sprocket chainwheel illustrated in the accompanying drawings, wherein.

DESCRIPTION OF THE PREFERRED EMBODIMENTS

Figure 1:
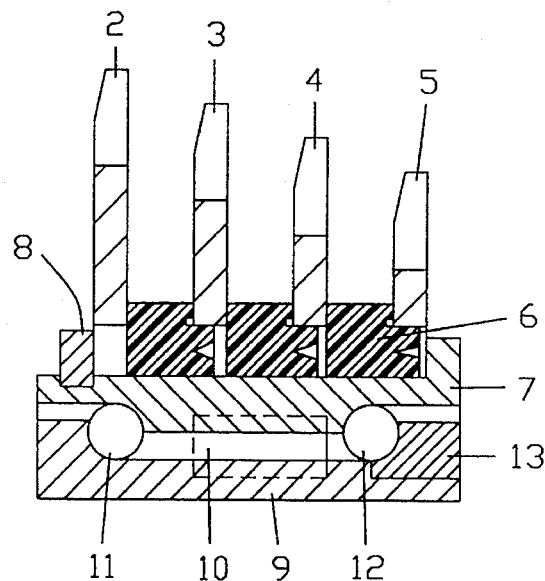
FIG. 1 shows a freewheel drive part with a multiple sprocket chainwheel, a chainwheel bushing, a freewheel mechanism and bearings in partial cross section.
Figure 2:
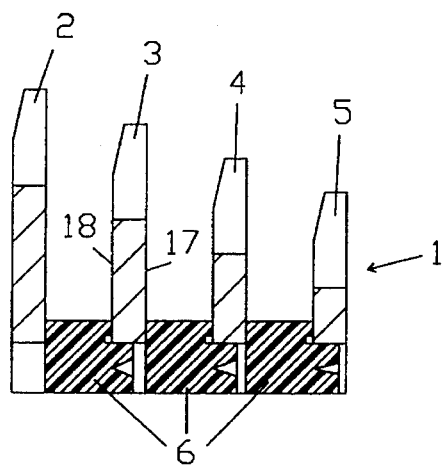
FIG. 2 shows the multiple sprocket chainwheel with sprockets and connecting rings, in partial cross section.

If 1 designates a multiple sprocket chainwheel of a freewheel drive part on the rear hub of a bicycle, the multiple sprocket chainwheel 1 preferably includes at least two sprockets, and in the illustrated embodiment, there are four sprockets 2, 3, 4 and 5, whereby the number of teeth on the sprocket 2 is greater than the number of teeth on the sprocket 3, the number of teeth on the sprocket 3 is greater than the number of teeth on the sprocket 4, and the number of teeth on the sprocket 4 is greater than the number of teeth on the sprocket 5. Between each two individual sprockets there is preferably a connecting ring 6, whereby the multiple sprocket chainwheel 1 essentially has a sandwich construction, and can be axially slid onto a chainwheel bushing 7 which supports an external longitudinal profile (not shown here), whereby such an external longitudinal profile preferably interacts with the inside diameter of the multiple sprocket and results in a connection which is non-rotational but axially movable.

Thus, in accordance with at least one preferred embodiment of the present invention, the multiple sprocket chainwheel 1 can preferably have a sandwich construction comprising layers essentially formed from sprockets 2, 3, 4 and 5, with each of the sprockets 2, 3, 4 and 5 preferably being interposed by a connecting ring 6. Thus, in the illustrated embodiment, the sandwich construction is preferably made up of three connecting rings interposed between four sprockets.

As shown in FIG. 1, the freewheel hub portion also preferably includes a freewheel mechanism 10, which preferably blocks in one direction of rotation and freewheels in the other direction of rotation, and acts between the chainwheel bushing 7 and a drive bushing 9, and preferably transmits the drive force of the chain in the driving direction to the hub of the rear wheel. For the assembly of a complete unit of a freewheel drive part, a first bearing 11 and a second bearing 12 are preferably located between the chainwheel bushing 7 and the drive bushing 9 in a cone shape, and are preferably fixed in place by an adjusting nut 13. Finally, a retaining ring 8 preferably fixes the multiple sprocket chainwheel 1 on the chainwheel bushing 7. Freewheel mechanisms will be generally well-known to those of ordinary skill in the art, and will thus not be described in further detail herein.

Figures 7, 8:
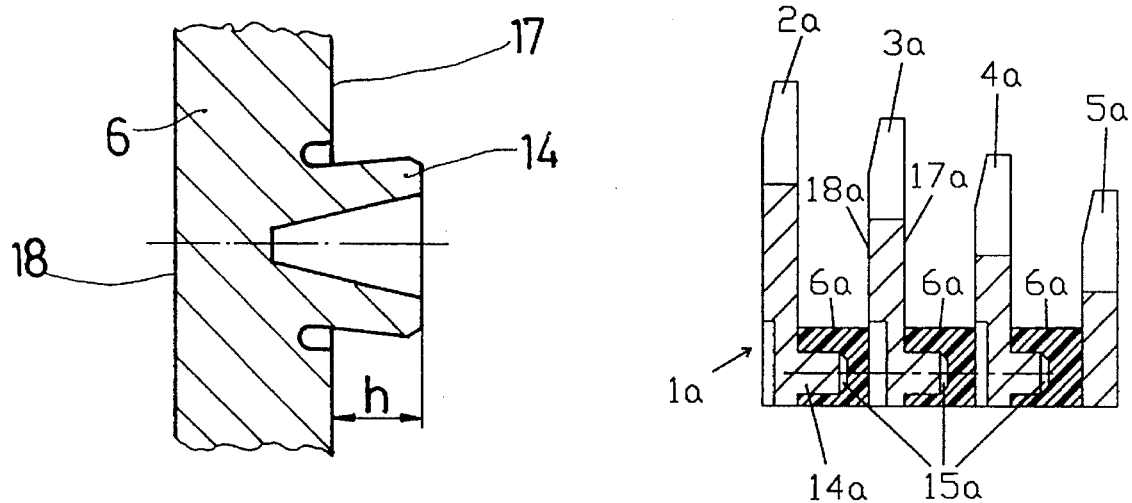
FIG. 7 shows the clamping extension on the connecting ring in a preferred embodiment, in cross section.
FIG. 8 shows a multiple sprocket chainwheel with different clamping devices than illustrated in FIG. 2, on sprockets and on connecting rings, in partial cross section.

FIG. 7 shows a clamping projection 14, which can have essentially any desired profile, but is shown here as an essentially cylindrical sleeve which is preferably hollow in the center. At least one clamping projection 14, which has a height h is preferably located on both plane surfaces 17 and 18 of the connecting ring 6, and can preferably be inserted into clamping points 15 which are located in the sprockets 2 to 5 opposite the clamping extensions 14.

Figure 3:
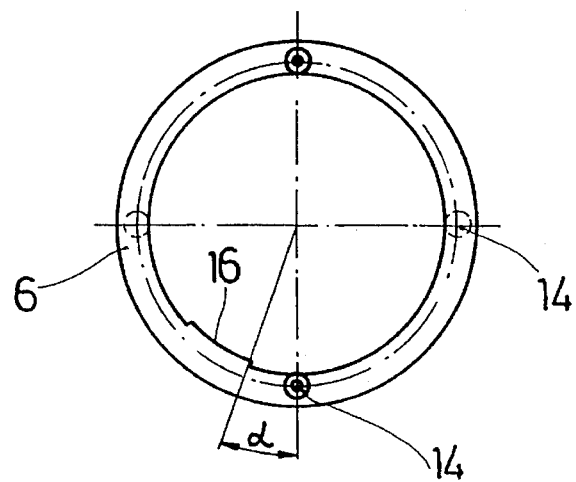
FIG. 3 shows the connecting ring with clamping extensions and a guide tooth.
Figures 4, 5, 6:
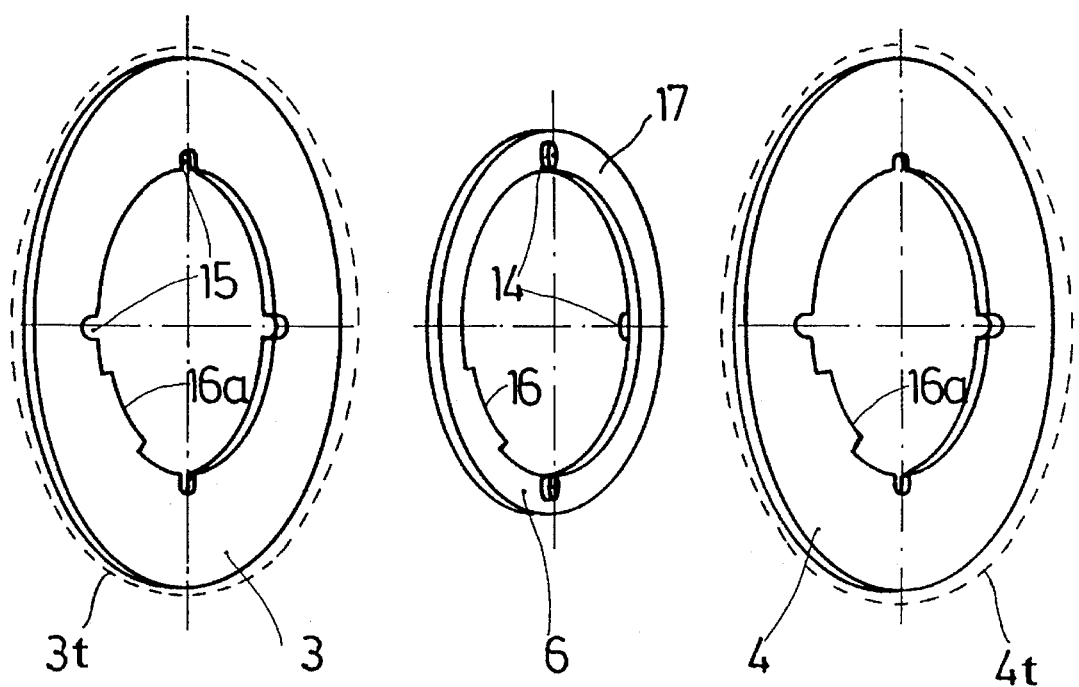
FIG. 4 shows a sprocket with clamping points, in a perspective view.
FIG. 5 shows the connecting ring in the position in which it can be clamped to the sprocket illustrated in FIG. 4, in a perspective view.
FIG. 6 shows a sprocket in the position in which it can be clamped to the connecting ring illustrated in FIG. 5, and thus to the sprocket illustrated in FIG. 4, in a perspective view.

As shown in FIG. 5, on the plane surface 17 of the connecting ring 6, there are preferably two clamping projections 14 on the vertical center axis, while on the plane surface 18 there are preferably two clamping projections 14 on the horizontal center axis. The sprockets 3 and 4 illustrated in FIGS. 4 and 6 preferably have clamping points 15 on both center axes, so that they can both be used from both sides for fastening a connecting ring 6. The term "fastening" is used, because the clamping projection 14 preferably forms a detachable force fit, or interference fit, with the clamping point 15, which can even be detached by hand. The elements which can be connected in the manner described above can preferably be assembled to one another only in a single position in relation to one another defined by a guide tooth 16 on the inside diameter of the sprockets 2–5, whereby the guide teeth 16, 16a should preferably coincide and lie on top of one another. Such a connection can be made by hand or mechanically, in which case errors will essentially be detected essentially no later than when the multiple sprocket chainwheel 1 is mounted on the chainwheel bushing 7, such that such errors will essentially not be able to occur on the bicycle. As shown in FIG. 3, the guide tooth 16 is preferably at a defined angle (alpha) in relation to the clamping projection 14, 14a, which is located on the vertical center axis, which is used in an analogous manner for the positioning of the respective guide tooth 16 in relation to the clamping points 15, 15a on the inside diameter of the sprockets 2 to 5.

Sprockets 3 and 4, illustrated respectively in FIGS. 4 and 6, will each typically include a plurality of teeth. Tooth arrangements 3t and 4t, corresponding to sprockets 3 and 4, respectively, are illustrated schematically, with a circular dotted line, in FIGS. 4 and 6, respectively.

FIG. 8 shows a reversal of the clamp connection for a multiple sprocket chainwheel 1a with sprockets 2a, 3a, 4a and 5a, which are separated from one another by connecting rings 6a. The sprockets 3a and 4a, on both plane surfaces 17a and 18a, preferably have clamping projections 14a, which can be inserted into clamping points 15a of the connecting rings 6. But the sprockets 2a and 5a lying on the respective axial ends of the multiple sprocket chainwheel in this case should preferably not have clamping projections 14a on their terminal-side plane surfaces, so that the overall width of the multiple sprocket chainwheel 1a can be maintained.

The illustrated embodiment, as shown in FIG. 3, has two clamping projections 14 at about 180 degrees from one another on the one plane surface 17, whereby the arrangement of the clamping projections 14 on the plane surface 18 of a given connecting ring 6 is offset by about 90 degrees in relation to the clamping projections 14 on the plane surface 17. Likewise, if an embodiment with three clamping projections 14 on the plane surface 17 is selected, these clamping projections 14 should be at an interval of 120 degrees from one another, while the clamping projections on the plane surface 18 should be oriented so that they are offset by 60 degrees from the clamping projections on the plane surface 17. Consequently, on the sprockets 2–5, where twice the number of clamping points 15 must be located, these clamping points 15 will be at the same respective angular interval from one another.

In accordance with at least one preferred embodiment of the present invention, as shown in FIG. 7, the clamping projections 14 may each preferably have an outer surface which forms an angle of about 7 or 8 degrees, such as 7.5 degrees, with respect to the central axis of the projection 14. This angle could conceivably also be anywhere in a range from about 4 degrees to about 15 degrees. For example, the angle could be about 4°, about 5°, about 6°, about 7°, about 8°, about 9°, about 10°, about 11°, about 12°, about 13°, about 14°, or about 15°. Angles less than about 4° or greater than about 15° are also conceivable.

Additionally, in accordance with at least one preferred embodiment of the present invention, as shown in FIG. 7, each clamping projection 14 may preferably be surrounded by an annular groove indented into the surface of connecting ring 6. Additionally, clamping projection 14 may preferably have disposed therein, as shown, a conical recess centered about the central axis of the clamping projection 14.

It is conceivable, withing the scope of the present invention, to provide a hybrid arrangement with respect to the embodiments shown in FIGS. 7 and 8. Particularly, it is conceivably to provide an arrangement where each connecting ring may be provided with at least one clamping projection 14 for being inserted into at least one clamping point 15 of a neighboring sprocket, and each sprocket may be provided with at least one clamping projection 14a for being inserted into at least one clamping point 15a of a neighboring connecting ring.

Preferably, in accordance with at least one preferred embodiment of the present invention, the clamping projections 14, 14a and the clamping points 15, 15a can preferably be configured so as to be detachable from one another upon application of a predetermined detaching force. In accordance with at least one preferred embodiment of the present invention, this predeteremined detaching force may be at least about 3 Newtons. Conceivably, the force could be at least about 2 Newtons, at least about 4 Newtons, at least about 5 Newtons, at least about 6 Newtons, at least about 7 Newtons, or any other value deemed appropriate.

Figure 9:
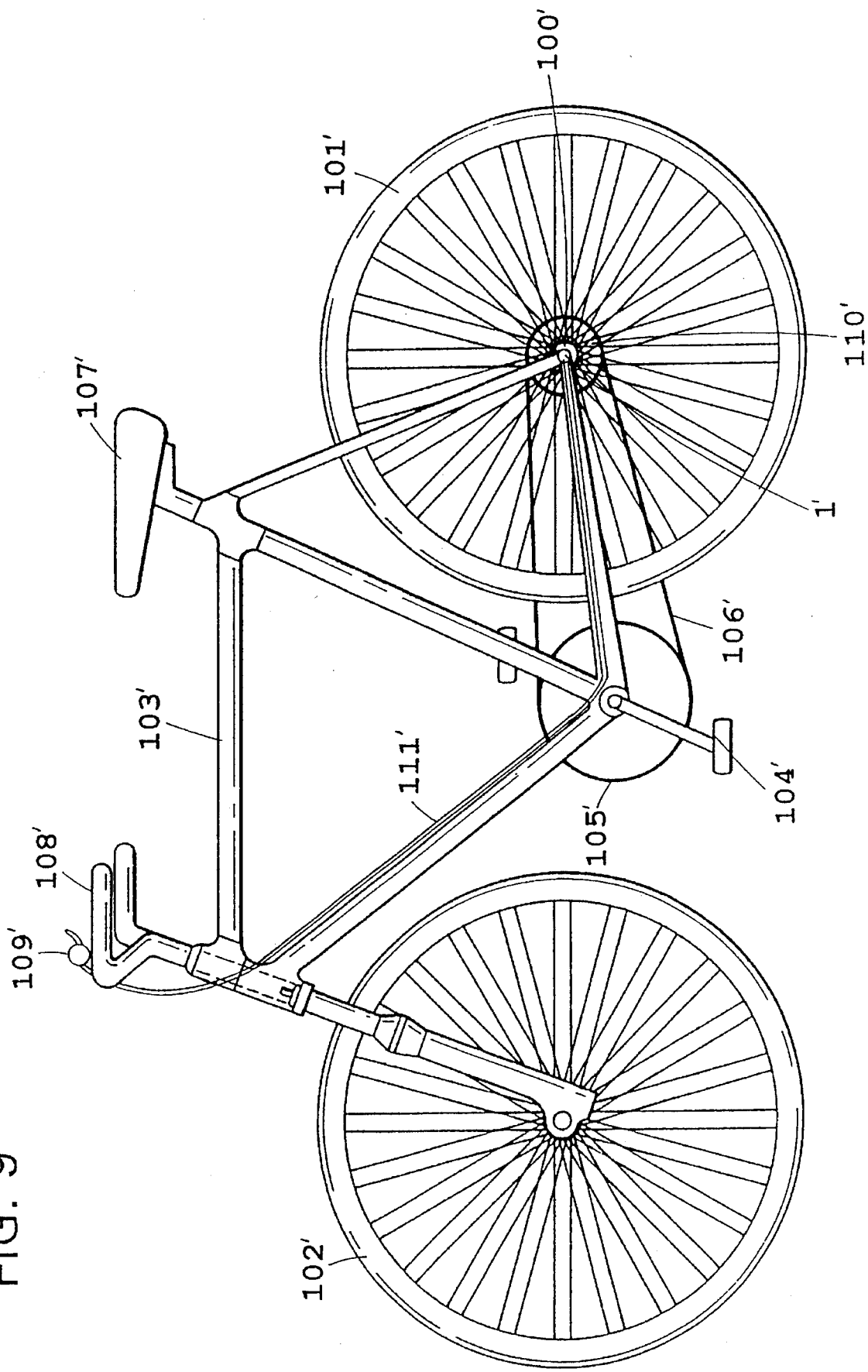
FIG. 9 illustrates a bicycle in which the present invention may be employed.

For a better understanding of the overall concept of the present invention, a general depiction of a bicycle having a multi-speed hub 100' on a rear wheel 101' thereof is provided in FIG. 9. It should be understood that, if appropriate, any components discussed herebelow with reference to FIG. 9 may be considered to be interchangeable with similar components discussed hereinabove with reference to FIGS. 1–8.

With reference to FIG. 9, the hub 100' can have a hub axle 1', by means of which the hub 100' can be attached to a frame 103' of the bicycle. The frame 103' can also preferably support a front wheel 102'. A chain 106' and pedal system 104', 105' can preferably be provided to transmit a drive power to the hub 100' and a rear wheel 101'. The pedals 104' are preferably attached to a drive sprocket set 105', the outside of which sprocket set 105' preferably engages the chain 106'. The chain 106' is also preferably engaged about the hub 100' by means of an additional drive sprocket set 110'. In addition to the above, a seat 107' can preferably be provided for the rider, while handlebars 108' can be provided for steering purposes. On the handlebars 108' there can also preferably be a gear shifting device 109' for shifting the gears of the multi-speed hub 100'. The shifting device 109' can preferably be operatively connected to the hub 100' by means of cables 111' that are fastened along the frame of the bicycle and preferably extend from the shifting device 109' to the hub 100'. Such cables 111' and shifting devices 109' are typically well known and are therefore not discussed in any further detail herein.

The present invention also contemplates a method of assembling a bicycle, wherein:

components of a bicycle, including a frame, at least two wheels, and a propelling arrangement, are provided;

the propelling arrangement includes: a chain; at least two sprocket sets to engage the chain, each of the at least two sprocket sets comprising at least one sprocket; at least two pedals, the at least two pedals being connected to one of the at least two sprocket sets; foot-powered moving means, the foot-powered moving means comprising the sole means for moving the bicycle during riding of the bicycle by a cyclist;

further components of the bicycle, including a seat for being disposed on the frame, a handlebar for steering the bicycle, a braking arrangement for slowing movement of the bicycle, are provided;

at least one wheel hub is mounted on at least one of the at least two wheels;

at least one of the at least two sprocket sets comprises:
    a first sprocket and a second sprocket;
    the first sprocket comprises an arrangement for connecting with one of the at least one wheel hub and an arrangement for carrying a portion of the chain during propulsion of the at least one of the front wheel and the rear wheel;
    the second sprocket comprises an arrangement for connecting with the same one of the at least one wheel hub and an arrangement for carrying a portion of the chain during propulsion of the at least one of the front wheel and the rear wheel;
    the first and second sprockets have a common axis of rotation;
    the first and second sprockets each have a plane of rotation;
  the bicycle is further provided with an arrangement for selectively transferring the chain between the first sprocket and the second sprocket;
  a connecting arrangement, interposed between the first and second sprockets, is provided for:
    non-rotatably connecting the first and second sprockets with one another; and
    holding the first and second sprockets in a fixed, spaced-apart relationship with respect to one another; and
  an arrangement is provided for permitting selective detachment of the first sprocket, second sprocket and connecting arrangement with respect to one another upon application of a detaching force on one or more of the first sprocket, second sprocket and connecting arrangement.

In accordance with at least one preferred embodiment of the present invention, a method for assembling a bicycle may include the steps of preassembling the first and second sprockets, as well as the connecting arrangement, with one another as at least a portion of a preassembled sprocket set, and then mounting the preassembled sprocket set at a hub of one of the bicycle wheels.

One feature of the invention resides broadly in the multiple sprocket chainwheel for bicycle derailleurs with at least two sprockets 2, 3, 4, 5 which have different numbers of teeth, and which are non-rotationally located on a chainwheel bushing 7, whereby between the sprockets 2, 3, 4, 5 there are spacer connecting rings 6, with bearings 11, 12 and a drive bushing 9 which is driven in the driving direction of rotation by the chainwheel bushing 7 by means of a freewheel mechanism 10, characterized by the fact that at least one connecting ring 6 on its two plane surfaces 17, 18 has at least one clamping projection 14 which projects from the two plane surfaces 17, 18 and the contour of which matches the contour of clamping positions 15 in the adjacent sprockets 5, 2, 3, 4, whereby a permanent connection can be made in the axial direction between the connecting rings 6 and sprockets 2, 3, 4, 5.

Another feature of the invention resides broadly in the multiple sprocket chainwheel characterized by the fact that any desired number of sprockets 5, 2, 3, 4 with any desired number of connecting rings 6 can be assembled into a chainwheel sprocket assembly.

Yet another feature of the invention resides broadly in the multiple sprocket chainwheel characterized by the fact that the sprockets 2, 3, 4, 5 and the connecting rings 6 have at least one guide tooth 16a, 16b, the position of which is at an angle a in relation to the clamping projections 14 on the connecting ring 6 and in relation to the clamping points 15 on the sprockets 2, 3, 4, 5, such that when the guide teeth 16a, 16b coincide, while retaining the axial center distances between the sprockets 2, 3, 4, 5 and the connecting rings 6, the clamping projections 14 are opposite the clamping points 15.

Still another feature of the invention resides broadly in the multiple sprocket chainwheel characterized by the fact that the external contour of the clamping projection 14 corresponds at least partly to the contour of the clamping point 15, plus a specified extra dimension to achieve a force fit or interference fit.

A further feature of the invention resides broadly in the multiple sprocket chainwheel characterized by the fact that the clamping points 15 are holes which have a circular circumference.

Another feature of the invention resides broadly in the multiple sprocket chainwheel characterized by the fact that the clamping points 15 are semicircular recesses which are open toward the center of the respective sprocket 2, 3, 4, 5.

Yet another feature of the invention resides broadly in the multiple sprocket chainwheel characterized by the fact that the height h of the clamping projection 14 is equal to or less than the width of the sprockets 2, 3, 4, 5.

Still another feature of the invention resides broadly in the multiple sprocket chainwheel characterized by the fact that the force required to break the frictional connection between the sprockets 2, 3, 4, 5 and the connecting rings 6 is at least 3 Newtons.

A further feature of the invention resides broadly in the multiple sprocket chainwheel for derailleurs to drive a hub bushing on the rear wheel [of a bicycle], with at least two sprockets 2a, 3a, 4a, 5a which have different numbers of teeth and which are located non-rotationally on a chainwheel bushing 7, whereby between the sprockets 2a, 3a, 4a, 5a there are spacer connecting rings 6a with bearings 11, 12 and a drive bushing 9, which are driven in the driving direction of rotation by the chainwheel bushing 7 by means of a freewheel mechanism 10, characterized by the fact that at least one sprocket 2a, 3a, 4a, 5a, on both its plane surfaces 17a, 18a, has at least one clamping projection 14a, the contour of which projects beyond both the plane surfaces 17a, 18a and can be inserted into clamping points 15 in the respective neighboring connecting rings 6a, whereby a permanent connection can be made in the axial direction between the connecting rings 6a and the sprockets 2a, 3a, 4a, 5a.

Types of transmissions for bicycles, and components thereof, which may be utilized in accordance with the embodiments of the present invention may be disclosed in the following U.S. Pat. No. 3,944,253 to Ripley on Mar. 16, 1976, entitled "Infinitely Variable Transmission for Pedal-Driven Vehicles"; U.S. Pat. No. 4,973,297 to Bergles on Nov. 27, 1990, entitled "Multispeed Drive Hub With More Than Three Speeds"; U.S. Pat. No. 4,721,015 to Hartmann on Jan. 26, 1988, entitled "Three Stage Planetary Driving Wheel for Pedal Powered Vehicles"; U.S. Pat. No. 4,063,469 to Bergles on Dec. 20, 1977, entitled "Multiple Speed Hub for a Vehicle Wheel"; U.S. Pat. No. 4,727,965 to Zach et al.; U.S. Pat. No. 4,721,013 to Steuer et al.; U.S. Pat. No. 4,651,853 to Bergles et al.; U.S. Pat. No. 4,628,769 to Nagano; and U.S. Pat. No. 4,400,999 to Steuer; and U.S. Pat. No. 5,273,500.

Examples of bicycles, in which the embodiments of the present invention may be employed, may be found in the following U.S. Pat. No. 5,324,059, which issued to Bryne on Jun. 28, 1994; U.S. Pat. No. 5,312,125 which issued to Tse-acu-a-o-shu on May 17, 1994; U.S. Pat. No. 5,242,182, which issued to Bezerra et al. on Sep. 7, 1993; and U.S. Pat. No. 5,240,268, which issued to Allsop et al. on Aug. 31, 1993.

Examples of derailleurs, which may be utilized in accordance with the embodiments of the present invention, may be found in the following U.S. Pat. No. 4,439,171, which issued to Bergles on Mar. 27, 1984; U.S. Pat. No. 4,231,264, which issued to Bergles on Nov. 4, 1980; U.S. Pat. No. 4,183,255, which issued to Leiter on Jan. 15, 1980; and U.S. Pat. No. 3,927,904, which issued to Bergles on Dec. 23, 1975.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 01 272.1, filed on Jan. 18, 1994, having inventors Frank Schmidt, Andreas Neuer, Gerhard Dumbser, and Jörg Bodmer, and DE-OS P 44 01 272.1 and DE-PS P 44 01 272.1, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A bicycle, said bicycle comprising:
   a frame;
   at least two wheels, said at least two wheels comprising at least a front wheel and a rear wheel;
   said at least two wheels being rotatably mounted on said frame;
   means for propelling at least one of said front wheel and said rear wheel;
   said propelling means comprising:
     a chain;
     at least two sprocket sets to engage said chain, each of said at least two sprocket sets comprising at least one sprocket;
     at least two pedals, said at least two pedals being connected to one of said at least two sprocket sets;
     foot powered moving means, said foot powered moving means comprising the sole moving means for moving said bicycle during riding of said bicycle;
   a seat, said seat being disposed on said frame;
   a handlebar for steering said bicycle;
   braking means for slowing the movement of said bicycle;
   at least one wheel hub being mounted on at least one of said at least two wheels;
   at least one of said at least two sprocket sets comprising:
     a first sprocket and a second sprocket;
     said first sprocket comprising:
       means for connecting with one of said at least one wheel hub;
       means for carrying a portion of said chain during propulsion of said at least one of said front wheel and said rear wheel;
     said second sprocket comprising:
       means for connecting with said one of said at least one wheel hub;
       means for carrying a portion of said chain during propulsion of said at least one of said front wheel and said rear wheel;
     said first sprocket and said second sprocket having a common axis of rotation;
     said first sprocket and said second sprocket each having a plane of rotation;
     means for selectively transferring said chain between said first sprocket and said second sprocket;
     a connecting ring, interposed between said first and second sprockets, for:
       fixedly connecting said first and second sprockets with one another; and
       holding said first and second sprockets in a fixed, spaced-apart relationship with respect to one another;
     means for permitting selective detachment of said first sprocket, said second sprocket and said connecting ring with respect to one another upon application of a detaching force on one or more of said first sprocket, said second sprocket and said connecting ring;
     said connecting ring comprising two opposing plane surfaces;
     each of said first and second sprockets comprising two opposing plane surfaces;
     said means for permitting selective detachment comprising:
       at least one clamping projection disposed on, and projecting from, at least one plane surface of one of the following a) and b):
         a) at least one of said first and second sprockets; and
         b) said connecting ring;
       at least one clamping position disposed in the other of said a) and b), said at least one clamping position comprising means for engaging and accommodating said at least one clamping projection;
       each of said at least one clamping projection having an outer contour;
       each of said at least one clamping position having a contour;
       the contour of each of said at least one clamping projection being engaged with the contour of its engaging clamping position.

2. Multiple sprocket chainwheel for bicycle derailleurs, said chainwheel comprising:
   at least two sprockets having varying numbers of teeth;
   a chainwheel bushing;
   each of said sprockets being mounted on said chainwheel bushing so as to be non-rotatable with respect to said chainwheel bushing;
   at least one spacer connecting ring, each said spacer connecting ring being disposed between adjacent ones of said sprockets;
   a drive bushing for being driven in a driving direction of rotation by said chainwheel bushing;
   a freewheel mechanism drivingly connecting said chainwheel bushing with said drive bushing;
   bearings for rotatably supporting at least said chainwheel bushing;
   a rotational axis being defined through said sprockets, said at least one connecting ring and said chainwheel bushing;
   each of said at least one spacer connecting ring comprises two opposing plane surfaces;
   at least one spacer connecting ring has, on each of its two plane surfaces, at least one clamping projection which projects from each of said two plane surfaces;
   a sprocket disposed adjacent said at least one spacer connecting ring has at least one clamping position for accommodating and engaging with said at least one clamping projection;
   each of said at least one clamping projection has an outer contour;
   each of said at least one clamping position has a contour;
   the contour of each of said at least one clamping projection matches with the contour of its engaging clamping position; and
   the contours matching with each other, of the at least one clamping protection and the at least one clamping position being engaged with one another, form a permanent connection, in the axial direction, between the corresponding at least one spacer connecting ring and the corresponding at least one of said sprockets.

3. Multiple sprocket chainwheel as claimed in claim 2, wherein:
   each of said sprockets has two opposing sides oriented generally orthogonally with respect to the rotational axis;

said at least one clamping position of each of said sprockets comprises:
- a first set of at least one clamping position for selectively accommodating the at least one clamping projection of a first spacer connecting ring disposed adjacent a first of said two opposing sides of said sprocket; and
- a second set of at least one clamping position for selectively accommodating the at least one clamping projection of a second spacer connecting ring disposed adjacent a second of said two opposing sides of said sprocket.

4. Multiple sprocket chainwheel as claimed in claim 3, wherein:
- each of said sprockets and each of said at least one spacer connecting ring comprises at least one guide tooth;
- each of the at least one guide tooth of each of said sprockets and each of said at least one spacer connecting ring being positioned at an angle in relation to the clamping projections on each connecting ring and in relation to the clamping positions on each of the sprockets, such that, upon axial alignment of the at least one guide tooth of a sprocket with respect to the at least one guide tooth of an axially adjacent connecting ring, each of the at least one clamping projection disposed on a given side of the connecting ring is axially aligned in a one-to-one correspondence with a corresponding one of the at least one clamping position of the sprocket.

5. Multiple sprocket chainwheel as claimed in claim 4, wherein:
- at least a portion of the external contour of each clamping projection has a dimension that is slightly larger than a corresponding dimension of at least a portion of the corresponding clamping position, to achieve a force-fit of each clamping projection with respect to each clamping position.

6. Multiple sprocket chainwheel as claimed in claim 5, wherein each clamping position comprises a circular hole.

7. Multiple sprocket chainwheel as claimed in claim 5, wherein each clamping position comprises a semicircular recess being open toward the center of the respective sprocket.

8. Multiple sprocket chainwheel as claimed in claim 6, wherein:
- each clamping projection has an axial dimension that is equal to or less than the width of the sprocket engaging with said clamping projection; and
- the force required to break the force-fit connection between each sprocket and a neighboring connecting spacer ring is at least about 3 Newtons.

9. Multiple sprocket chainwheel as claimed in claim 3, wherein:
- each clamping projection has an axial dimension that is equal to or less than the width of the sprocket engaging with said clamping protection; and
- the force required to break the force-fit connection between each sprockets and a neighboring connecting ring is at least about 3 Newtons.

10. Multiple sprocket chainwheel as claimed in claim 2, wherein:
- each of said sprockets and each of said at least one spacer connecting ring comprises at least one guide tooth;
- each of the at least one guide tooth of each of said sprockets and each of said at least one spacer connecting ring being positioned at an angle in relation to the clamping projections on each connecting ring and in relation to the clamping positions on each of the sprockets, such that, upon axial alignment of the at least one guide tooth of a sprocket with respect to the at least one guide tooth of an axially adjacent connecting ring, each of the at least one clamping projection disposed on a given side of the connecting ring is axially aligned in a one-to-one correspondence with a corresponding one of the at least one clamping position of the sprocket.

11. Multiple sprocket chainwheel as claimed in claim 10, wherein:
- at least a portion of the external contour of each clamping projection has a dimension that is slightly larger than a corresponding dimension of at least a portion of the corresponding clamping position, to achieve a force-fit of each clamping projection with respect to each clamping position.

12. Multiple sprocket chainwheel as claimed in claim 11, wherein each clamping position comprises a circular hole.

13. Multiple sprocket chainwheel as claimed in claim 11, wherein each clamping position comprises a semicircular recess being open toward the center of the respective sprocket.

14. Multiple sprocket chainwheel as claimed in claim 12, wherein:
- each clamping projection has an axial dimension that is equal to or less than the width of the sprocket engaging with said clamping projection; and
- the force required to break the force-fit connection between each sprocket and a neighboring connecting spacer ring is at least about 3 Newtons.

15. Multiple sprocket chainwheel as claimed in claim 13, wherein:
- each clamping projection has an axial dimension that is equal to or less than the width of the sprocket engaging with said clamping projection; and
- the force required to break the force-fit connection between each sprockets and a neighboring connecting ring is at least about 3 Newtons.

16. Multiple sprocket chainwheel as claimed in claim 2, wherein:
- at least a portion of the external contour of each clamping projection has a dimension that is slightly larger than a corresponding dimension of at least a portion of the corresponding clamping position, to achieve a force-fit of each clamping projection with respect to each clamping position.

17. Multiple sprocket chainwheel as claimed in claim 16, wherein each clamping position comprises a circular hole.

18. Multiple sprocket chainwheel as claimed in claim 16, wherein:
- each clamping position comprises a semicircular recess being open toward the center of the respective sprocket;
- each clamping projection has an axial dimension that is equal to or less than the width of the sprocket engaging with said clamping projection; and
- the force required to break the force-fit connection between each sprocket and a neighboring connecting spacer ring is at least about 3 Newtons.

19. Multiple sprocket chainwheel as claimed in claim 17, wherein:
- each clamping projection has an axial dimension that is equal to or less than the width of the sprocket engaging with said clamping projection; and
- the force required to break the force-fit connection between each sprockets and a neighboring connecting ring is at least about 3 Newtons.

20. Multiple sprocket chainwheel for derailleurs to drive a hub bushing on the rear wheel of a bicycle, said chainwheel comprising:

at least two sprockets having varying numbers of teeth;

a chainwheel bushing;

each of said sprockets being mounted on said chainwheel bushing so as to be non-rotatable with respect to said chainwheel bushing;

at least one spacer connecting ring, each said spacer connecting ring being disposed between adjacent ones of said sprockets;

a drive bushing for being driven in a driving direction of rotation by said chainwheel bushing;

a freewheel mechanism drivingly connecting said chainwheel bushing with said drive bushing;

bearings for rotatably supporting at least said chainwheel bushing;

a rotational axis being defined through said sprockets, said at least one connecting ring and said chainwheel bushing;

each of said sprockets comprises two opposing plane surfaces;

at least one sprocket has, on both of its plane surfaces, at least one clamping projection;

each of said at least one clamping projection has an outer contour;

the outer contour of each of said at least one clamping projection projects beyond both of said plane surfaces;

a connecting ring disposed adjacent said at least one sprocket has at least one clamping point for accommodating and engaging With said at least one clamping projection;

the outer contour of each of said at least one clamping projection being inserted into its engaging clamping point; and the insertion of the at least one clamping projection into its engaging clamping point forming a permanent connection, in the axial direction, between the corresponding at least one spacer connecting ring and the corresponding at least one of said sprockets.

\* \* \* \* \*

UNITED STATES PATENT AND TRADEMARK OFFICE
CERTIFICATE OF CORRECTION

PATENT NO.  : 5,522,611
DATED       : June 4, 1996
INVENTOR(S) : Frank SCHMIDT, Andreas NEUER, Gerhard DUMBSER and Jörg BODMER It is certified that error appears in the above-indentified patent and that said Letters Patent is hereby corrected as shown below:

In column 11, line 51, Claim 9, after 'claim', delete "3," and insert --5,--.

Signed and Sealed this

Twenty-fourth Day of December, 1996

Attest:

BRUCE LEHMAN

Attesting Officer

Commissioner of Patents and Trademarks